(12) United States Patent
Hicks

(10) Patent No.: US 7,594,602 B1
(45) Date of Patent: Sep. 29, 2009

(54) ANTI-FRAUD CHECK PRINTING

(75) Inventor: Terry Hicks, San Matoe, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 11/374,946

(22) Filed: Mar. 13, 2006

(51) Int. Cl.
*G06F 17/60* (2006.01)

(52) U.S. Cl. .......................................... 235/379; 705/45

(58) Field of Classification Search ................. 235/379, 235/3, 380, 382; 705/39–45, 75, 64, 70, 705/72, 77, 78; 283/57–59
See application file for complete search history.

(56) References Cited

U.S. PATENT DOCUMENTS

| | | | | |
|---|---|---|---|---|
| 4,385,285 A | * | 5/1983 | Horst et al. ................. | 382/119 |
| 5,909,673 A | * | 6/1999 | Gregory ....................... | 705/45 |
| 6,041,315 A | * | 3/2000 | Pollin .......................... | 705/45 |
| 2003/0115155 A1 | * | 6/2003 | Doran .......................... | 705/75 |
| 2003/0225694 A1 | * | 12/2003 | Algiene ....................... | 705/44 |
| 2006/0036537 A1 | * | 2/2006 | Lawrence et al. ............. | 705/39 |
| 2006/0212391 A1 | * | 9/2006 | Norman et al. ............... | 705/40 |

* cited by examiner

*Primary Examiner*—Daniel St. Cyr
(74) *Attorney, Agent, or Firm*—Osha • Liang LLP

(57) ABSTRACT

A check is printed on a generic form that does not include a pre-printed account number (e.g., a blank sheet of paper). In response to detecting a request for check printing on the generic form, fraud prevention techniques are performed to ensure validity of the printed check.

18 Claims, 7 Drawing Sheets

ANTI-FRAUD CHECK PRINTING

BACKGROUND

The present invention relates to printing checks on a computer system. Financial services software has automated many repetitive, but important tasks. For example, payroll software is designed to ease the process of managing payroll information. Once information about employees and payment methods is entered into the payroll software (e.g., name, and account numbers), checks can be automatically populated and printed by an attached printer.

Conventionally, check forms are ordered directly from the bank and are received with preprinted portions such a payor and an account number. The account number links funds tendered by the check with a particular account to provide the funds. Checks can also be ordered from third-party sources that may verify account information with the bank.

Checks can also be printed on generic forms that do not already include the account number. In one example, a check can be printed on a blank sheet of paper. In another example, a preprinted form can include the payor, but not the account number. By leaving off the account number, checks associated with several different account numbers can be printed without the need for constantly changing feed sources.

Because checks can be printed without verification of the account number on the check, invalid checks can be printed. For example, an unscrupulous user may generate fraudulent checks with fake account numbers as tender for goods. Also, a user may erroneously enter the wrong account number. In still another example, a user may access the payroll software to write checks that, although valid, are not authorized by an owner of the account.

SUMMARY

In various embodiments, the present invention relates to printing checks on a computer system. In one embodiment, a check is printed on a generic form that does not include a preprinted account number (e.g., a blank sheet of paper). In response to detecting a request for check printing on the generic form, fraud prevention techniques are performed to ensure validity of the printed check.

In one embodiment, fraud prevention includes verifying ownership of an account associated with the account number. Ownership can be verified by, for example, depositing random amounts into the account. The owner accesses the account and provides the random amounts to complete the ownership verification. In another embodiment, the verified owner is issued a PIN number for future authentications. The account number can then be activated for generic check printing.

In another embodiment, fraud prevention is preformed in real-time, i.e., with a short delay between receiving and approving the request for check printing. The owner can be prompted to enter the PIN number for matching. The account number can be checked against a list of valid account numbers to make sure that it is has not been, for example, closed or restricted. Optionally, availability of funds can also be confirmed.

One skilled in the art will recognize that these Figures are merely examples of the operation of the invention according to one embodiment and that other configurations and modes of operation can be used without departing from the essential characteristics of the invention.

DETAILED DESCRIPTION OF THE EMBODIMENTS

Various embodiments for systems and methods for printing checks on a computer system are described. The checks can be printed on generic forms that do not include account numbers. Examples of generic forms include paper with various implementations of preprinted blank checks, and a blank sheet of paper.

Figure 1A:
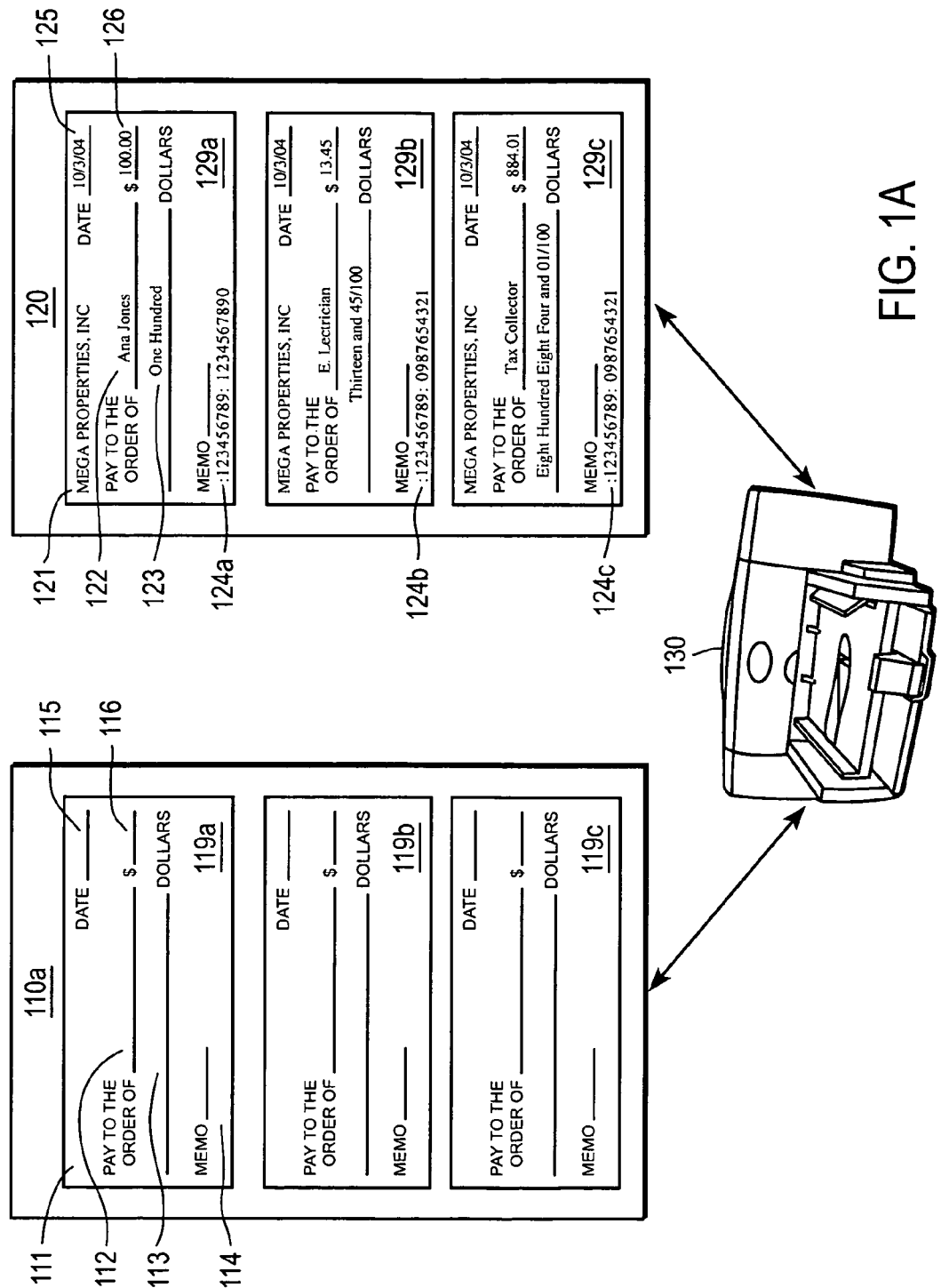
FIGS. 1A-B are schematic diagrams illustrating preprinted and generic check forms that do not include account number printing according to one embodiment of the present invention.

FIG. 1A is a schematic diagram illustrating a preprinted check form 110a that does not include an account number, according to one embodiment of the present invention. Generally, an output form 120, with the account number, is generated by a printer 130 using the preprinted check form 110a as a feed.

Figure 1B:
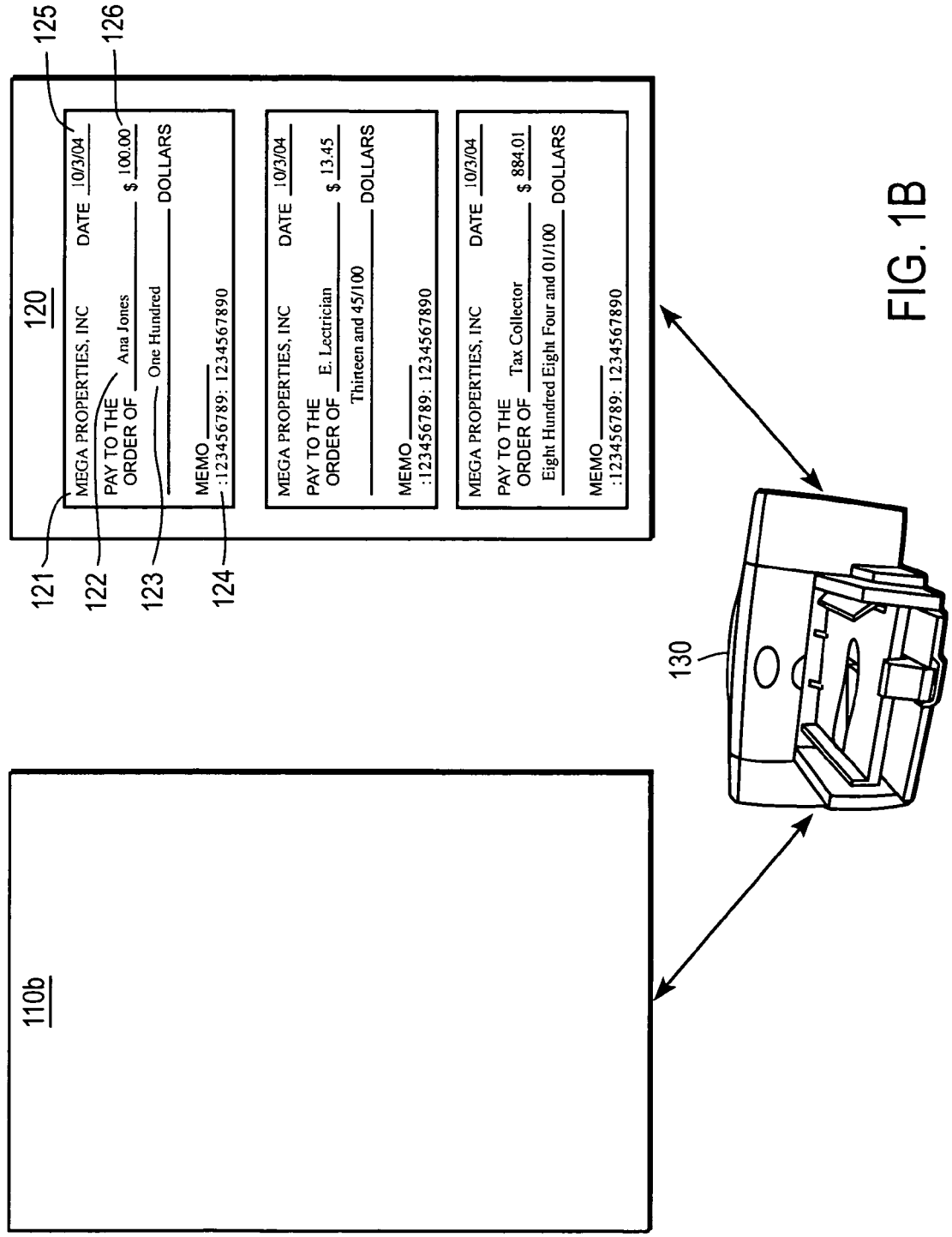

The preprinted check form 110a includes one or more blank checks 119a-c for creating a legal tender. The blank checks 119a-c include fields for custom data such as payor line 111, payee line 112, long hand line 113, account number line 114, date line 115, and amount in numerals 116. The preprinted check form 110a does not include a verified account number. Conventionally, pre-printed checks issued by a bank of an account holder generally have an account number, and will not be issued unless the account number is valid. FIG. 1B illustrates a generic check form 110b that is a blank sheet of paper (i.e., the blank sheet of paper does not include any blank checks). Both preprinted check form 110a and generic check form 110b can include enhancements such as background images, coloring, or other customizations. Other variations of generic forms are possible.

The output form 120 includes printed checks 129a-c that have been filled in by the printer 130. The printed checks 129a-c include custom data added by the printer 130 such as payor 121, payee 122, amount in long hand 123, account number 124a-c, date 125, and amount in numerals 126. Each account number 124a-c can refer to, for example, a checking account, savings account, money market account, or cash account. As displayed on the printed checks 129a-c, the account numbers 124a-c can be included in various formats. For example, the account numbers 124a-c can be listed after an ABA routing number and before a check number. In one embodiment, the account numbers 124a-c on the printed checks 129a-c are from different accounts. In some embodiments, as described in greater detail below, the printed checks 129a-c are generated by a verified and authorized account owner, using currently valid account numbers 124a-c, and are verified as having sufficient available funds to cover the check amount. Without such verifications and authorizations, invalid checks can be generated as a result of fraud, error, or negligence.

Figure 2:
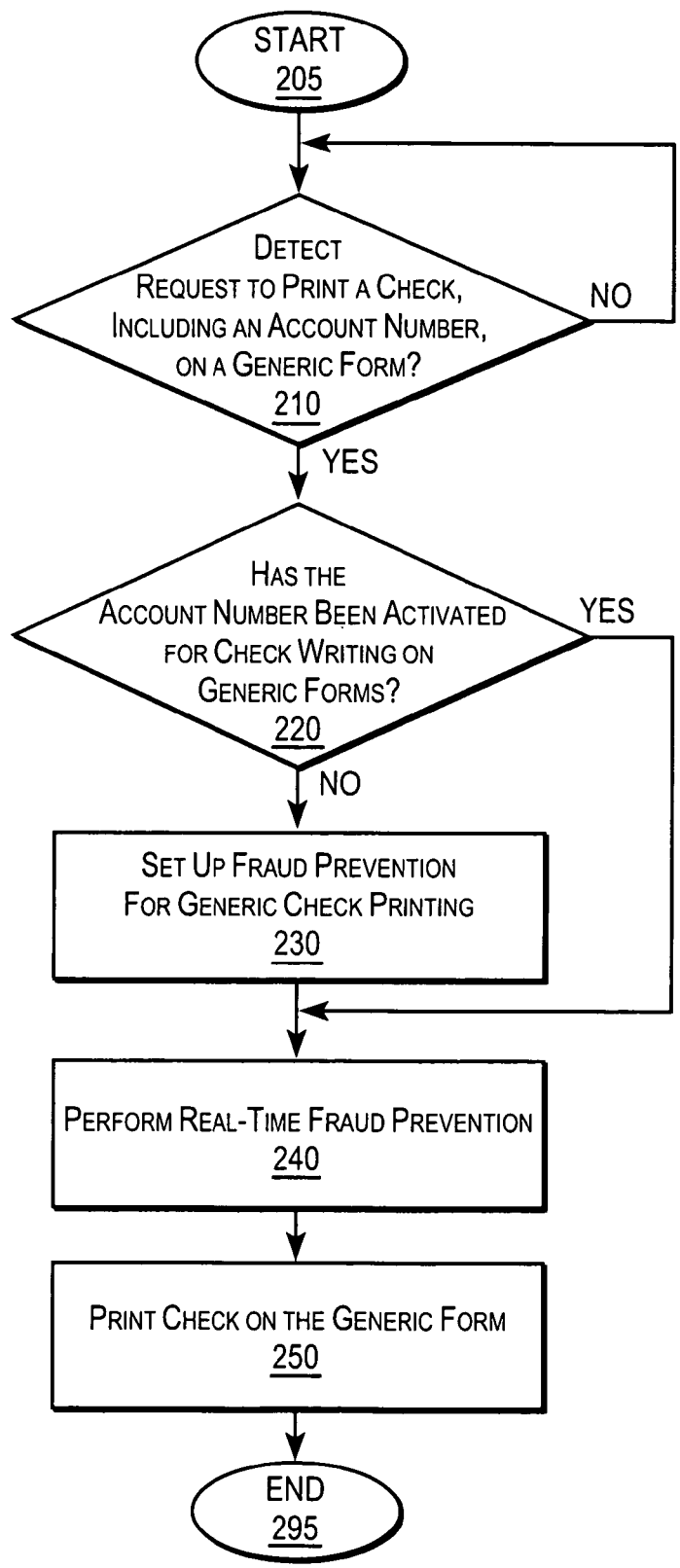
FIG. 2 is a flow chart illustrating a method for printing a valid check on the generic form according to one embodiment of the present invention.

FIG. 2 is a flow chart illustrating a method 200 for generating the output form 120 with printed checks 129a-c according to one embodiment of the present invention. A user of financial services software for payroll, bill pay or other purposes can enter a request to print checks directly from the financial services software (e.g., local software or web-based). For example, after entering hours for the week into software for tracking payroll amounts, a manager can leverage preexisting data by having the same software print the payroll checks. Thus, the payroll checks can be printed without having to enter payor names, amounts, dates, account numbers, and other information needed for check printing.

The request to print a check, including an account number, on a generic form is detected 210 (e.g., by a daemon or function call). A user can select from one or more available account numbers for funding the check. The request to print a check can be initiated by a user, for example, when selecting a button. The button can be required for a generic form so that the selected account number can be included on the printed check.

If the account number has not been activated for check writing on generic forms 210, fraud prevention for generic check printing is set up 230. In one embodiment, to indicate that the account number has yet to be activated, a flag associated with the account number can be set to FALSE, and the flag can be encrypted to prevent tampering. One embodiment for activating the account number is described below with reference to FIG. 3. Once activated, the flag can be set to TRUE.

For an account number that has been activated 220, real-time fraud prevention is performed 240. One embodiment for performing real-time fraud prevention is described below with reference to FIG. 4. The fraud prevention process includes three functions: (1) preventing printed checks from being printed by unauthorized users; (2) preventing printed checks having invalid or inactive account numbers; and (3) preventing printed checks in amounts exceeding available funds. These functions can be used individually, or in any combination. Real-time as used herein refers to fraud prevention being performed between the steps of detecting the request and printing the check, and can range in time from immediate to several minutes (e.g., depending on network conditions).

After approval of the request, the check is prepared for printing on the generic (or preprinted) form 250. A preview of the printed check, having data fields filled in, can be displayed to a user prior to printing the physical check on an attached printer. To do so, data fields associated with the check can have embedded tags used to match preexisting data with an appropriate data field (e.g., a tag for an account number field can be implemented as <ACCT NO>). Once satisfied, a user can select a print icon or other trigger to initiate printing.

Figure 3:
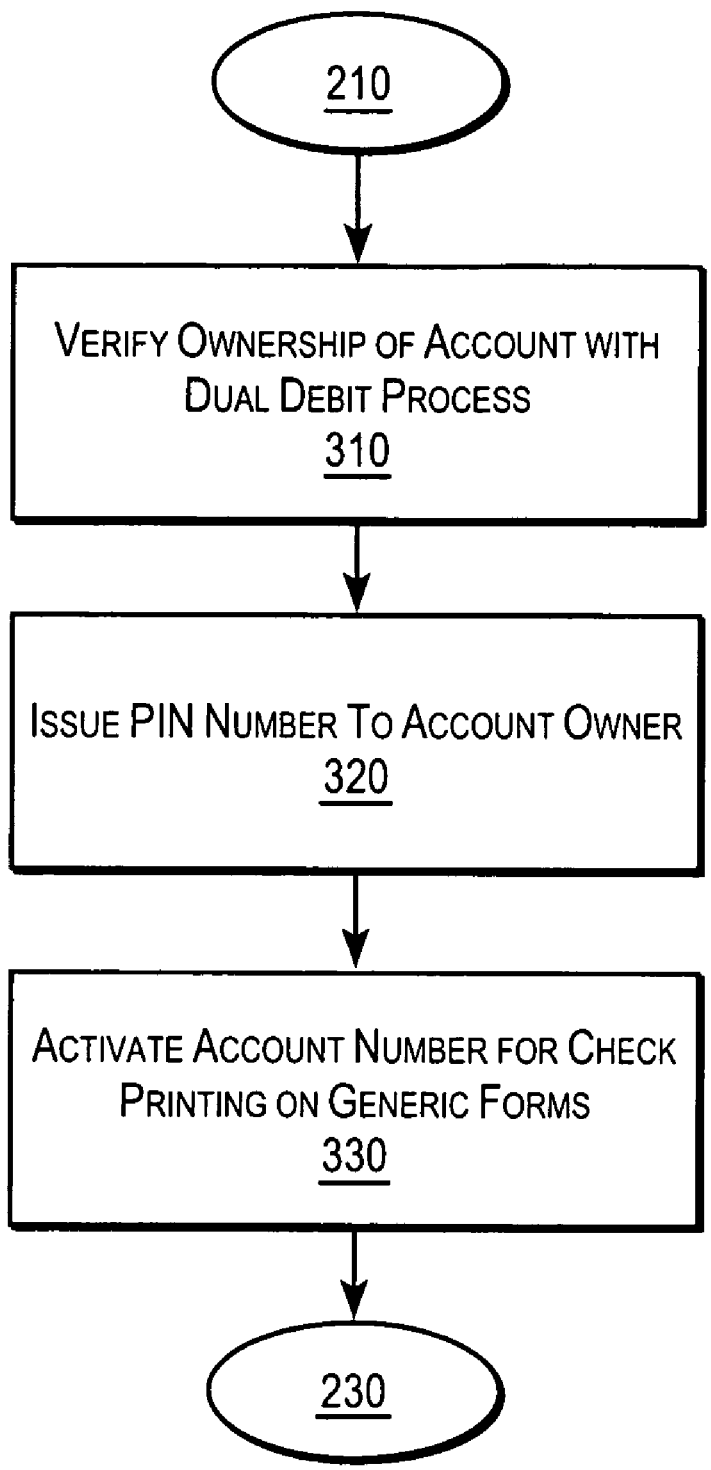
FIG. 3 is a flow chart illustrating a method for activating the account number for check printing on the generic form.

FIG. 3 is a flow chart illustrating a method 220 for performing real-time fraud prevention according to one embodiment of the present invention. Account ownership can be verified with, for example, dual deposits 310. After an alleged account number is entered along with other information (e.g., bank name, type of account, etc.), a verification service can send two random amounts of deposits to an associated account. The deposits are typically small amounts ranging from one to several cents, and can be electronically transmitted for efficiency. A user accesses the account (e.g., online) to determine the amounts of deposits, and then enters the amounts to verify ownership of the account.

A PIN number is issued to the account number 320. The PIN number can include several ASII characters such as a string of numbers. The PIN number can be provided immediately upon verification of ownership, or sent via mail as a further protection.

The account number can then be activated for check printing on generic forms 330. In one embodiment, a flag is changed from FALSE to TRUE so that the configuration steps can be bypassed when future requests for check printing are received.

Figure 4:
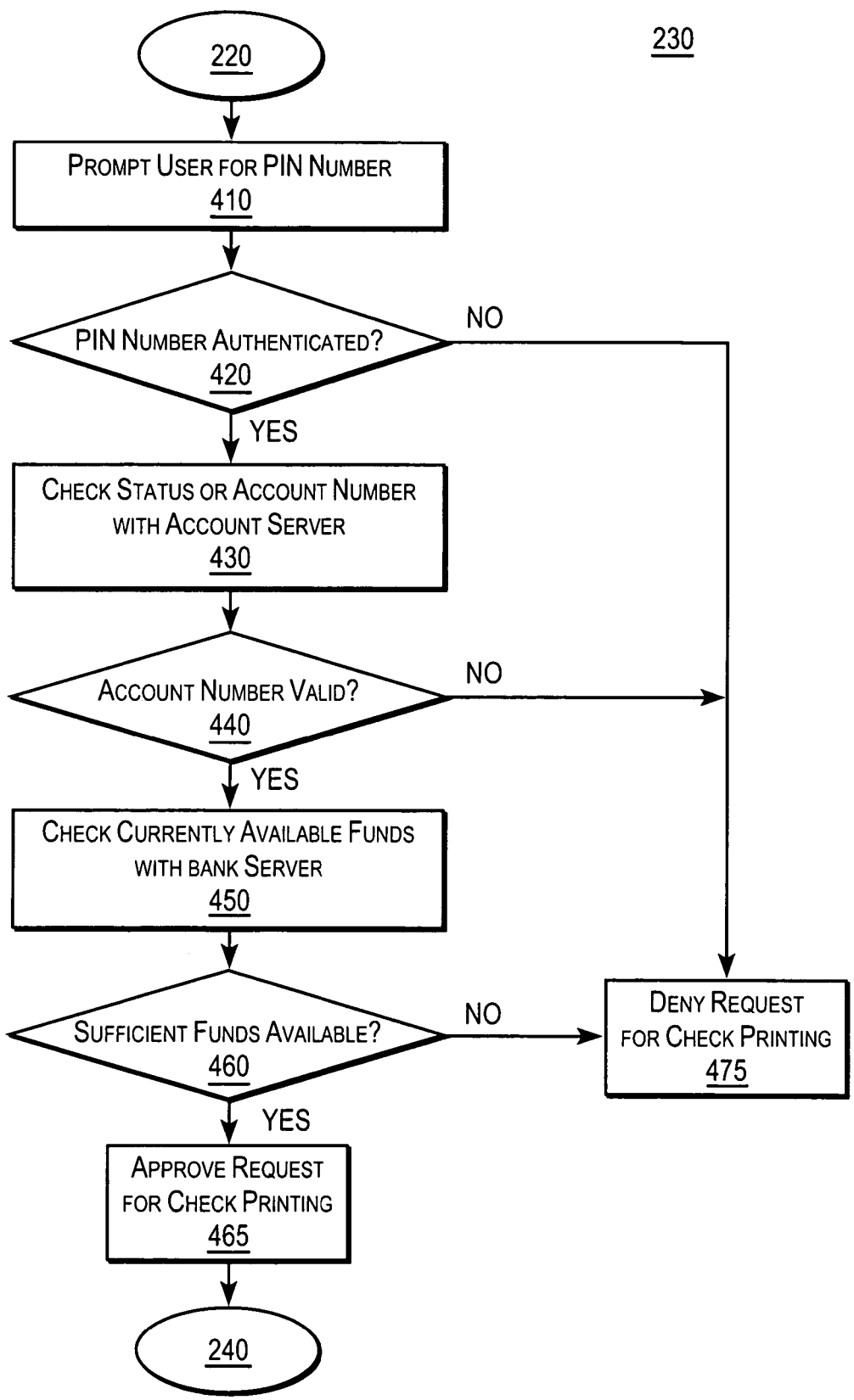
FIG. 4 is a flow chart illustrating a method for performing real-time fraud prevention according to one embodiment of the present invention.

FIG. 4 is a flow chart illustrating a method 230 for performing real-time fraud prevention according to one embodiment of the present invention. Upon receiving indication of a request to print a check, fraud prevention is preformed prior to allowing the check to be printed.

A user is prompted for entering a PIN number. The PIN number verifies ownership as described above. The PIN number can be entered, for example, in a pop-up box or web form, and transmitted, for example, using SSL to keep the PIN secure. The entered PIN is compared against the PIN associated with the account number for a match. If the PIN number does not match, the user cannot be authenticated as the owner or as an authorized user 420, resulting in a denial of the request for check printing.

If the PIN number is authenticated 420, a status of the account number is checked with, for example, an account server 430. The account number can be sent through a network to the account server. The account number can be checked against a list of valid accounts. In one embodiment, the bank or financial institution can maintain a list of its own accounts. In another embodiment, a third party can maintain a list of accounts that is updated by the bank or financial institution. The account list can be updated at over various periods such as daily, hourly, or in real-time. If the account number is not valid 440, the request for check printing is denied 475.

Many variations of the method 230 are possible. Fraud prevention can be performed by omitting steps, adding steps, or reordering steps, and still be within the spirit of the present invention.

Optionally, if the account number is valid 440, currently available funds are checked by consulting, for example, a bank server 450. In one example, the check amount and the account number can be sent through a network to the bank server. In another example, the bank server can be queried for a balance. The available funds refer to a balance in an account as a result of subtracting all current debits from all current credits. An associated account is accessed to ensure that the check amount does not exceed the currently available funds (or the amount of funds that will be available in the near future). If sufficient funds are not available 460, and thus, the request for check printing is denied 475. On the other hand, if sufficient funds are available 460, the request for check printing is approved 465.

Figure 5:
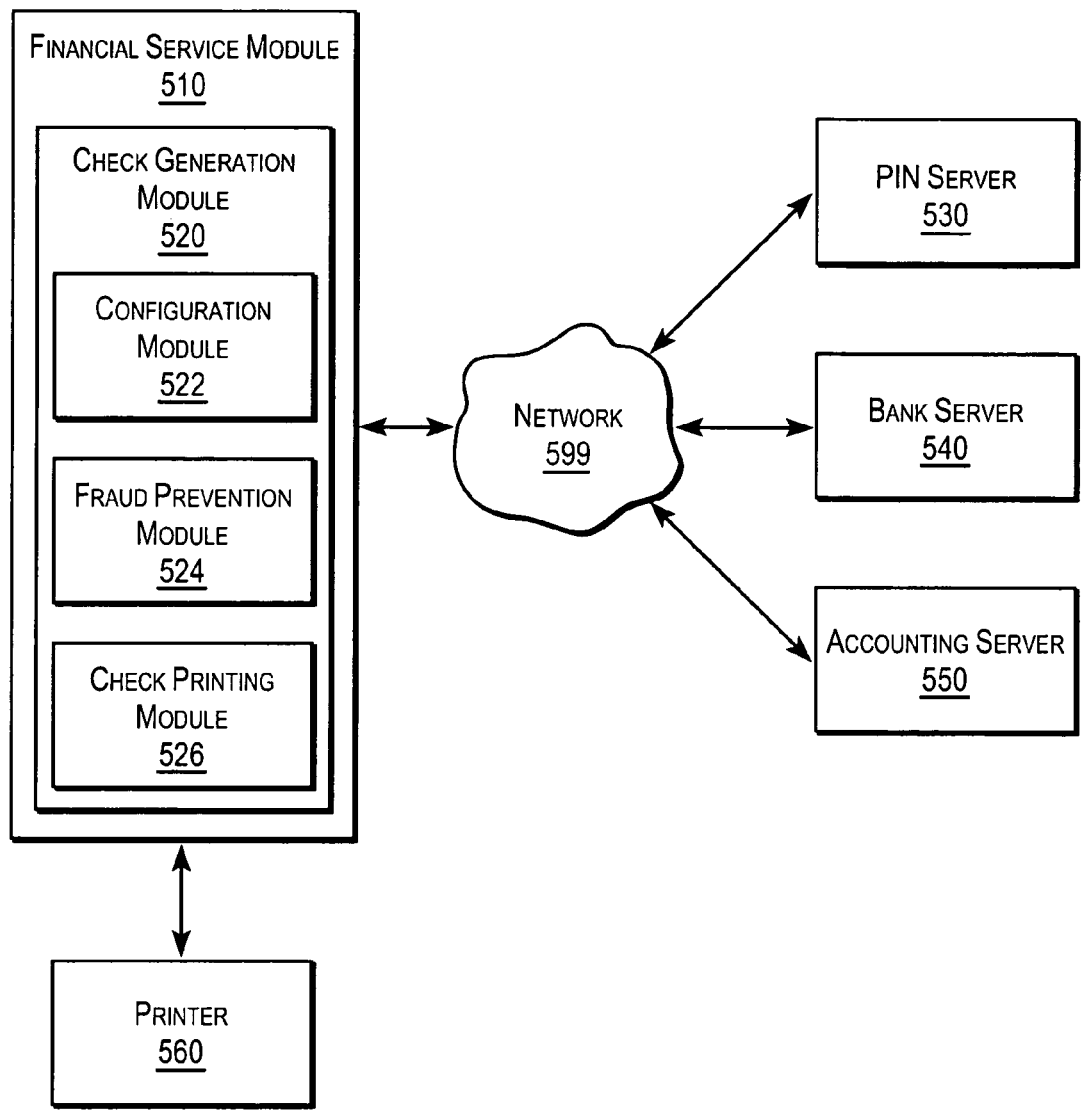
FIG. 5 is a block diagram of a system to print a valid check on the generic form according to one embodiment of the present invention.

FIG. 5 is a block diagram of a system 500 to print a valid check on the generic form according to one embodiment of the present invention. The system 500 comprises a financial service module 510, a PIN server 530, a bank server 540, an account server 550, and a printer 560. System components are in communication with one another via a network 599. The network 599 can be the Internet or any other type of a data or cellular network. The components can be implemented in hardware and/or software as one or more individual modules or part of a more comprehensive application. The components can execute on, for example, a personal computer including a processor, a memory (including an operating system), and input/output devices (e.g., a keyboard and a display). The components can be completely on a local machine, be distributed across the Internet on several machines, or be administered from a web-based application.

The financial service module 510 can present one or more user interfaces including data entry fields, drop down boxes, buttons, and browsers, for user interaction. In one embodiment, the financial service module 510 provides one or more services such as payroll, bill pay, check writing, accounting, and other services related to electronic banking.

The financial service module 510 further comprises a check generation module 520 for printing valid (fraud-free) checks. The check generation module 520 comprises a configuration module 522, a fraud prevention module 524, and a check printing module 526. In one embodiment, the configuration module 522 sets up fraud prevention for generic check printing as described above with reference to FIG. 3. The configuration module 522 can verify ownership of an account with the dual debit process. The dual debits can be sent to the bank server 540 for deposit into the account, and those amounts can be received from the user to complete verification. Then, the configuration module 522 can issue a PIN number to an account owner. The PIN number can be generated by the PIN server 530 responsive to a request from the configuration module 522. Afterwards, the configuration module 522 can activate an account number for check printing on generic forms.

Figure 6:
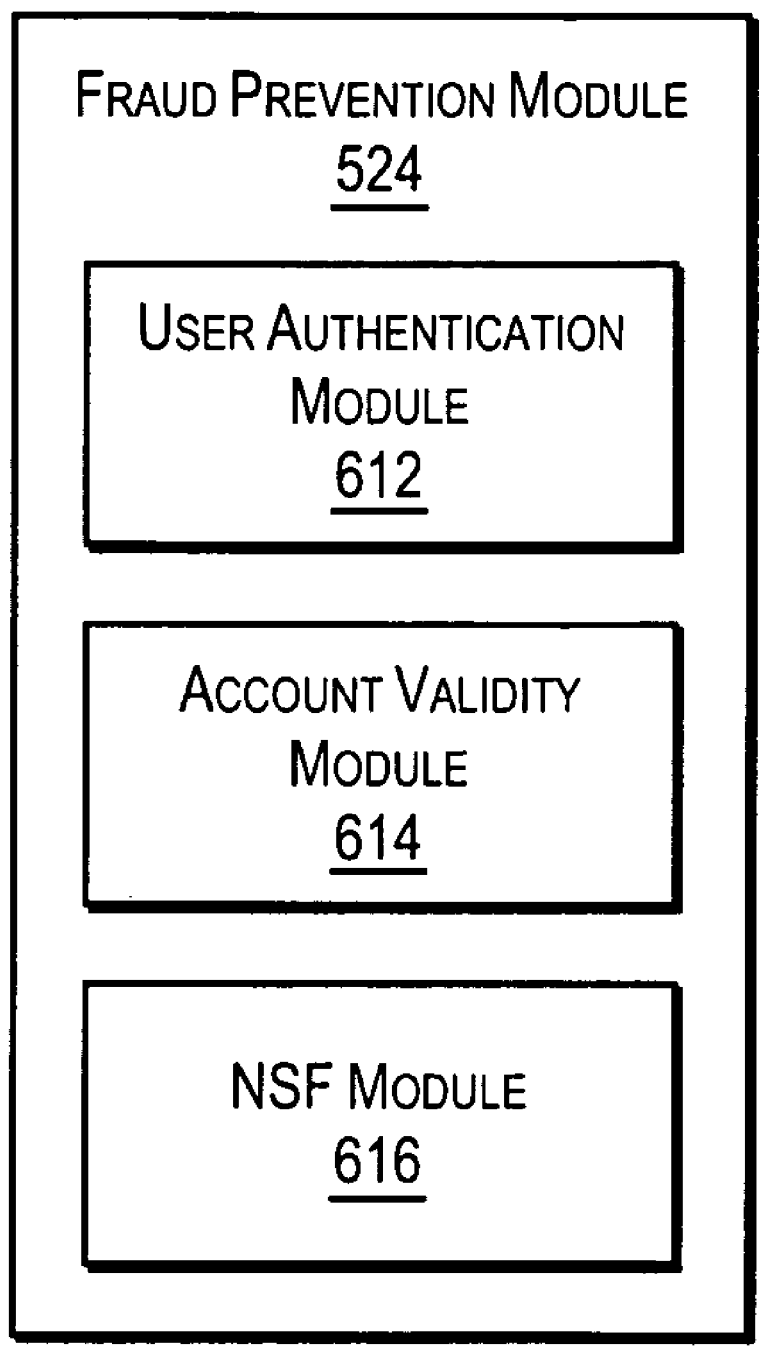
FIG. 6 is a block diagram of a fraud prevention module to perform real-time fraud prevention according to one embodiment of the present invention.

As illustrated in the block diagram of FIG. 6, the fraud prevention module 524 comprises a user authentication module 612, an account validity module 614, and an NSF module 616. In one embodiment, components of the fraud prevention module 524 perform real-time fraud prevention. In response to the financial service module 510 detecting a request to print a check on a generic form, the fraud prevention module 524 performs one or more fraud prevention techniques. The user authentication module 612 can prompt a user for a PIN number for authentication. The account validity module 614 can receive an account number and determine whether the account is still active. Optionally, the NSF module 616 can check currently available funds to ensure that the check will not be rejected for non-sufficient funds. Based on results from the fraud checks, the fraud prevention module 524 either approves or rejects the request for check printing.

The PIN server 530, the bank server 540, and the account server 550 can communicate with the fraud prevention module 524, in one embodiment, using secure protocols (e.g., the SSL protocol), and requiring authentication from the fraud prevention module 524. The PIN server 530 can include a table that associates a list of account numbers with issued PIN numbers for authentication. The bank server 540 can include online access to bank accounts for the dual debit process, each of which is identified by an account number. The bank server 540 can also verify available funds. The account server 550 can include a list of valid bank accounts. In one embodiment, the account server 550 is operated by a third-party, and in another embodiment, is integral with the bank server and is operated by a bank or financial institution.

The printer 560 can be, for example, a laser printer, an ink-jet printer, or a dot matrix printer. The printer 560 executes the request for check printing, once approved.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying," refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for printing a certifiable check on a generic form using a financial services software executing on a personal computer, the method comprising:
    detecting a request for printing the certifiable check on the generic form from a requester,
        wherein the request comprises an account number associated with an account and an amount of funds to be printed on the certifiable check, and
        wherein the account number is received from preexisting data within the financial services software executing on the personal computer;
    authenticating the requestor's ownership of the account by the financial services software executing on the personal computer;
    verifying a status of the account number in response to detecting the request for check printing;
    accessing preexisting data associated with the account owned by the requester to obtain an amount of funds available in the account, wherein the preexisting data is accessed via the financial services software executing on the personal computer;
    issuing, by the financial services software executing on the personal computer, a command to print the certifiable check on the generic form upon successful authentication of the requestor's ownership of the account and verification of the account number;
    intercepting the command to print the certifiable check and determining, by the financial services software executing on the personal computer, whether sufficient funds are available in the account by comparing a value corresponding to the amount of funds to be printed on the certifiable check with the amount of funds available in the account; and
    denying the command to print the certifiable check when the value corresponding to the amount of funds to be printed is greater than the amount of funds available in the account.

2. The method of claim 1, further comprising:
    denying the request for printing the certifiable check when the authentication of the requestor's ownership fails.

3. The method of claim 1, wherein authenticating the requestor's ownership of the account comprises:
    prompting the requester, in response to the request, to enter a PIN number; and
    determining whether the PIN number is associated with the account number, wherein the requestor's ownership of the account is authenticated when the PIN number is associated with the account number.

4. The method of claim 3, wherein the PIN number associated with the account is provided to the requestor prior to the request for printing, wherein the PIN number is provided to the requestor upon the requestor successfully proving ownership of the account.

5. The method of claim 1, further comprising:
    denying the request for printing the certifiable check when the verification of the status of the account number fails.

6. The method of claim 1, wherein verifying of the status of the account comprises:
    sending a request to look-up the account number to an account server, wherein the account server is configured to receive notification when account numbers have been deactivated; and
    receiving, from the account server, a response that indicates whether the account number has been deactivated.

7. The method of claim 1, wherein the generic form comprises a plain sheet of paper.

8. The method of claim 1, wherein the generic form comprises a pre-printed check without the account number.

9. The method of claim 1, further comprising:
    after receiving the request and prior to authentication of ownership and verification of the account number:
    determining whether the account associated with the account number has been activated, wherein the account has been activated when the certifiable check comprising the account number is allowed to be printed on the generic form; and
    denying the request for printing the certifiable check when the account is not activated.

10. A computer readable memory storing a computer program executable by a processor, the computer program comprising instructions for printing a certifiable check on a generic form using a financial services software executing on a personal computer, the instructions comprising instructions for:
    detecting a request for printing the certifiable check on the generic form from a requester,
        wherein the request comprises an account number associated with an account and an amount of funds to be printed on the certifiable check, and
        wherein the account number is received from preexisting data within the financial services software executing on the personal computer;
    authenticating the requestor's ownership of the account by the financial services software executing on the personal computer;
    verifying a status of the account number in response to detecting the request for check printing;
    accessing preexisting data associated with the account owned by the requester to obtain an amount of funds available in the account, wherein the preexisting data is accessed via the financial services software executing on the personal computer;
    issuing, by the financial services software executing on the personal computer, a command to print the certifiable check on the generic form upon successful authentication of the requestor's ownership of the account and verification of the account number;
    intercepting the command to print the certifiable check and determining, by the financial services software executing on the personal computer, whether sufficient funds are available in the account by comparing a value corresponding to the amount of funds to be printed on the certifiable check with the amount of funds available in the account; and denying the command to-print the certifiable check when the value corresponding to the amount of funds to be printed is greater than the amount of funds available in the account.

11. The computer program of claim 10, the instructions further comprising instructions for:
denying the request for printing the certifiable check when the authentication of ownership fails.

12. The computer program of claim 10, wherein instructions for authenticating the requestor's ownership of the account comprise instructions for:
prompting the requestor, in response to the request, to enter a PIN number; and
determining whether the PIN number is associated with the account number, wherein the requestor's ownership of the account is authenticated when the PIN number is associated with the account number.

13. The computer program of claim 12, wherein the PIN number associated with the account is provided to the requester prior to the request for printing, wherein the PIN number is provided to the requestor upon the requester successfully proving ownership of the account.

14. The computer program of claim 10, the instructions further comprising instructions for:
denying the request for printing the certifiable check when the verification of the status of the account number fails.

15. The computer program of claim 10, wherein verification of the status of the account comprises:
sending a request to look-up the account number to an account server, wherein the account server is configured to receive notification when account numbers have been deactivated; and
receiving, from the account server, a response that indicates whether the account number has been deactivated.

16. The computer program of claim 10, wherein the generic form comprises a plain sheet of paper.

17. The computer program of claim 10, wherein the generic form comprises a pre-printed check without the account number.

18. The computer program of claim 10, further comprising instructions for:
after receiving the request and prior to authentication of ownership and verification of the account number:
determining whether the account associated with the account number has been activated, wherein the account has been activated when the certifiable check comprising the account number is allowed to be printed on the generic form; and
denying the request for printing the certifiable check when the account is not activated.

* * * * *

UNITED STATES PATENT AND TRADEMARK OFFICE
CERTIFICATE OF CORRECTION

PATENT NO. : 7,594,602 B1
APPLICATION NO. : 11/374946
DATED : September 29, 2009
INVENTOR(S) : Terry Hicks It is certified that error appears in the above-identified patent and that said Letters Patent is hereby corrected as shown below:

On the Cover Page, item (75) Inventor, the first inventor's city of residence "San Matoe" should read --San Mateo--.

In Claim 1, column 7, line 21, "requester" should read --requestor--;

In Claim 1, column 7, line 34, "requester" should read --requestor--;

In Claim 3, column 7, line 59, "requester" should read --requestor--;

In Claim 10, column 8, line 36, "requester" should read --requestor--;

In Claim 10, column 8, line 49, "requester" should read --requestor--;

In Claim 13, column 9, line 20, "requester" should read --requestor--;

In Claim 13, column 9, line 21, "requester" should read --requestor--.

Signed and Sealed this

Tenth Day of November, 2009

David J. Kappos
*Director of the United States Patent and Trademark Office*